Patented Aug. 1, 1933

1,920,451

UNITED STATES PATENT OFFICE 1,920,451

MANUFACTURE OF CONDENSATION PRODUCTS OF A UREA AND FORMALDEHYDE

Walter von Knilling, Mannheim, Germany, assignor to I. G. Farbenindustrie Aktiengesellschaft, of Frankfort-on-the-Main, Germany, a Corporation of Germany No Drawing. Application July 5, 1928, Serial No. 290,704, and in Germany July 16, 1927

10 Claims. (Cl. 260—3)

This invention relates to the manufacture of condensation products of a urea and formaldehyde.

I have found that condensation products of urea or thiourea, or mixtures of both, and formaldehyde are obtained in a simple manner by subjecting a mixture of the urea chosen and solid polymers of formaldehyde, with an addition of a small quantity of mild alkaline agents, such as organic bodies of alkaline reaction or salts, such as sodium acetate, borax and the like, which are capable of lowering the melting point of the reaction mass, or of both these agents, to fusion, followed by a hardening treatment. Both these agents will be referred to for the sake of brevity in the following and in the claims as alkaline condensing agents. According to this invention clear, colorless melts are obtained which furnish solid white or glass-like masses according to the conditions of a subsequent hardening. The formation of the last named products is greatly facilitated, if urea alone be employed, by an addition of thiourea. The fusion may also be effected under pressure and/or can be continued until the reaction mass is solid, in which latter case it is advantageous to add from 1 to 10 per cent by weight of the whole charge of an organic body of alkaline reaction, such as formamide. The solid white mass obtained hereby can be transformed into hard, glass-like and transparent plates or foils which are free from bubbles or blisters, by a hardening process such as by pressing the pulverized product at a pressure of several hundred atmospheres and at a temperature of about 100° C. The condensation products can be advantageously employed as adhesives for example in veneering wood or glass or in combining glass plates with plates of other materials, such as comprise derivatives of cellulose and the like, as are known in the trade as cellon, cellophane, or celluloid. In this case the hardening treatment is performed after the surfaces of the materials to be combined have been covered with a layer of the finely disintegrated condensation product. The veneered plates comprising glass offer the special advantage of not being liable to splintering on breaking.

The following examples will further illustrate the nature of the said invention which however is not limited thereto.

Example 1

An intimate mixture of 50 parts of urea, 13 parts of thiourea, 240 parts of trioxymethylene, and 1 to 5 parts of sodium acetate is heated in an oil bath at 140° C. for about 20 minutes. A clear viscous melt is obtained, which is poured into moulds and hardened in a drying oven, the temperature being slowly raised from 50° to 100° C. In this manner a colorless, transparent product, with the hardness of glass, is obtained. If the fusing process be stopped at the end of about 16 minutes, hardening the still quite mobile, clear melt furnishes an opaque white solid product.

Example 2

An intimate mixture of 200 parts of urea, 52 parts of thiourea, 240 parts of trioxymethylene, 6 parts of sodium acetate and/or 20 parts of formamide are heated in an oil bath at 140° C. for about 19 minutes, the melt becoming very viscous. This melt is transformed on cooling into a hard white mass which, on being reduced to a fine powder and exposed to a pressure of about 400 atmospheres for 1 hour at 100° C., forms a glass-hard, colorless, transparent mass, entirely free from bubbles. The amount of formamide employed may vary between 1 and 10 per cent of the total charge, and the range of pressure applied to the powdered melt is between 200 and 1000 atmospheres.

The finely powdered condensation product may also be employed, inter alia, as an adhesive, for example in veneering wood. An exceedingly intimate and waterproof connection is obtained for exampe by strewing a thin layer of the finely powdered condensation product, prepared in the above manner, between two surfaces of wood, intended to be joined together, and then treating them in a press at 100° C.

Example 3

An intimate mixture of 60 parts of urea, 60 parts of trioxymethylene and from 1 to 5 parts of potassium acetate is heated in an oil bath for about 20 minutes to from 135° to 140° C. A clear viscous melt is obtained which is poured into moulds and hardened in a drying oven by heating slowly to from 50° to 80° C. A glass-like transparent and colorless product is obtained which sometimes, shows a slight opalescence.

Example 4

An intimate mixture of 76 parts of thiourea, 60 parts of trioxymethylene and from 1 to 5 parts of borax is heated in an oil bath for 20 minutes at a temperature of about 140° C. A clear, slightly yellow viscous melt is obtained which can be hardened as described in the foregoing examples.

What I claim is:

1. A process for producing condensation products of a urea and formaldehyde which comprises fusing a mixture of at least one urea substance, selected from the group consisting of urea and thiourea, a solid polymer of formaldehyde and an alkaline condensing agent in the absence of a liquid diluent and hardening the condensation product obtained by heating.

2. A process for producing condensation products of a urea and formaldehyde which comprises fusing a mixture of urea, thiourea, a solid polymer of formaldehyde and an alkaline condensing agent in the absence of a liquid diluent and hardening the condensation product obtained by heating.

3. A process for producing condensation products of a urea and formaldehyde which comprises fusing at a pressure above atmospheric pressure a mixture of at least one urea substance, selected from the group consisting of urea and thiorurea, and solid polymer of formaldehyde and an alkaline condensing agent in the absence of a liquid diluent and hardening the condensation product obtained by heating.

4. A process for producing condensation products of a urea and formaldehyde which comprises fusing at a pressure above atmospheric pressure a mixture of urea, thiourea, a solid polymer of formaldehyde and an alkaline condensing agent in the absence of a liquid diluent and hardening the condensation product obtained by heating.

5. A process for producing condensation products of a urea and formaldehyde which comprises fusing a mixture of at least one urea substance, selected from the group consisting of urea and thioureau, a solid polymer of formaldehyde and an alkaline condensing agent in the absence of a liquid diluent and hardening the condensation product obtained by heating and applying a pressure above atmospheric pressure.

6. A process for producing condensation products of a urea and formaldehyde which consists in fusing a mixture of at least one urea substance, selected from the group consisting of urea and thiourea, a solid polymer of formaldehyde and an alkaline condensing agent in the absence of a liquid diluent, disintegrating the condensation product and hardening it by heating and applying a pressure above atmospheric pressure.

7. A process for producing condensation products of a urea and formaldehyde which comprises fusing a mixture of at least one urea substance, selected from the group consisting of urea and thiourea, a solid polymer of formaldehyde, an organic body of alkaline reaction and an alkaline condensing agent in the absence of a liquid diluent and hardening the condensation product obtained by heating.

8. A process for producing condensation products of a urea and formaldehyde which comprises fusing a mixture of urea, thiourea, a solid polymer of formaldehyde and an alkaline condensing agent in the absence of a liquid diluent and hardening the condensation product obtained by heating and applying a pressure above atmospheric pressure.

9. A process for producing condensation products of a urea and formaldehyde which comprises fusing at a pressure above atmospheric pressure a mixture of at least one urea substance, selected from the group of urea and thiourea, a solid polymer of formaldehyde and an alkaline condensing agent in the absence of a liquid diluent and hardening the condensation product obtained by heating and applying a pressure above atmospheric pressure.

10. A process for producing condensation products of a urea and formaldehyde which comprises fusing at a pressure above atmospheric pressure a mixture of urea, thiourea, a solid polymer of formaldehyde and an organic alkaline condensing agent in the absence of a liquid diluent and hardening the condensation product obtained by heating and applying a pressure above atmospheric pressure.

WALTER von KNILLING.

---

CERTIFICATE OF CORRECTION.

Patent No. 1,920,451.  August 1, 1933.

WALTER von KNILLING.

It is hereby certified that error appears in the printed specification of the above numbered patent requiring correction as follows: Page 1, line 56, for "240" read 60; and that the said Letters Patent should be read with this correction therein that the same may conform to the record of the case in the Patent Office.

Signed and sealed this 28th day of November, A. D. 1933.

F. M. Hopkins
Acting Commissioner of Patents.

(Seal)

minutes at a temperature of about 140° C. A clear, slightly yellow viscous melt is obtained which can be hardened as described in the foregoing examples.

What I claim is:

1. A process for producing condensation products of a urea and formaldehyde which comprises fusing a mixture of at least one urea substance, selected from the group consisting of urea and thiourea, a solid polymer of formaldehyde and an alkaline condensing agent in the absence of a liquid diluent and hardening the condensation product obtained by heating.

2. A process for producing condensation products of a urea and formaldehyde which comprises fusing a mixture of urea, thiourea, a solid polymer of formaldehyde and an alkaline condensing agent in the absence of a liquid diluent and hardening the condensation product obtained by heating.

3. A process for producing condensation products of a urea and formaldehyde which comprises fusing at a pressure above atmospheric pressure a mixture of at least one urea substance, selected from the group consisting of urea and thiourea, and solid polymer of formaldehyde and an alkaline condensing agent in the absence of a liquid diluent and hardening the condensation product obtained by heating.

4. A process for producing condensation products of a urea and formaldehyde which comprises fusing at a pressure above atmospheric pressure a mixture of urea, thiourea, a solid polymer of formaldehyde and an alkaline condensing agent in the absence of a liquid diluent and hardening the condensation product obtained by heating.

5. A process for producing condensation products of a urea and formaldehyde which comprises fusing a mixture of at least one urea substance, selected from the group consisting of urea and thioureau, a solid polymer of formaldehyde and an alkaline condensing agent in the absence of a liquid diluent and hardening the condensation product obtained by heating and applying a pressure above atmospheric pressure.

6. A process for producing condensation products of a urea and formaldehyde which consists in fusing a mixture of at least one urea substance, selected from the group consisting of urea and thiourea, a solid polymer of formaldehyde and an alkaline condensing agent in the absence of a liquid diluent, disintegrating the condensation product and hardening it by heating and applying a pressure above atmospheric pressure.

7. A process for producing condensation products of a urea and formaldehyde which comprises fusing a mixture of at least one urea substance, selected from the group consisting of urea and thiourea, a solid polymer of formaldehyde, an organic body of alkaline reaction and an alkaline condensing agent in the absence of a liquid diluent and hardening the condensation product obtained by heating.

8. A process for producing condensation products of a urea and formaldehyde which comprises fusing a mixture of urea, thiourea, a solid polymer of formaldehyde and an alkaline condensing agent in the absence of a liquid diluent and hardening the condensation product obtained by heating and applying a pressure above atmospheric pressure.

9. A process for producing condensation products of a urea and formaldehyde which comprises fusing at a pressure above atmospheric pressure a mixture of at least one urea substance, selected from the group of urea and thiourea, a solid polymer of formaldehyde and an alkaline condensing agent in the absence of a liquid diluent and hardening the condensation product obtained by heating and applying a pressure above atmospheric pressure.

10. A process for producing condensation products of a urea and formaldehyde which comprises fusing at a pressure above atmospheric pressure a mixture of urea, thiourea, a solid polymer of formaldehyde and an organic alkaline condensing agent in the absence of a liquid diluent and hardening the condensation product obtained by heating and applying a pressure above atmospheric pressure.

WALTER von KNILLING.

CERTIFICATE OF CORRECTION.

Patent No. 1,920,451.    August 1, 1933.

WALTER von KNILLING.

It is hereby certified that error appears in the printed specification of the above numbered patent requiring correction as follows: Page 1, line 56, for "240" read 60; and that the said Letters Patent should be read with this correction therein that the same may conform to the record of the case in the Patent Office.

Signed and sealed this 28th day of November, A. D. 1933.

F. M. Hopkins
Acting Commissioner of Patents.

(Seal)

CERTIFICATE OF CORRECTION.

Patent No. 1,920,451.  August 1, 1933.

WALTER von KNILLING.

It is hereby certified that error appears in the printed specification of the above numbered patent requiring correction as follows: Page 1, line 56, for "240" read 60; and that the said Letters Patent should be read with this correction therein that the same may conform to the record of the case in the Patent Office.

Signed and sealed this 28th day of November, A. D. 1933.

(Seal)

F. M. Hopkins
Acting Commissioner of Patents.